(12) United States Patent
Sun (10) Patent No.: US 12,322,191 B2
(45) Date of Patent: Jun. 3, 2025

(54) LANE LINE DETERMINATION METHOD AND SYSTEM, VEHICLE, AND STORAGE MEDIUM

(71) Applicant: NIO TECHNOLOGY (ANHUI) CO., LTD, Hefei (CN)

(72) Inventor: Sichen Sun, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 452 days.

(21) Appl. No.: 17/839,692

(22) Filed: Jun. 14, 2022

(65) Prior Publication Data

US 2022/0398854 A1 Dec. 15, 2022

(30) Foreign Application Priority Data

Jun. 15, 2021 (CN) .......................... 202110659852.1

(51) Int. Cl.
*G06V 20/56* (2022.01)
*G06T 7/38* (2017.01)
*G06T 7/70* (2017.01)

(52) U.S. Cl.
CPC .............. *G06V 20/588* (2022.01); *G06T 7/38* (2017.01); *G06T 7/70* (2017.01); *G06T 2207/10028* (2013.01); *G06T 2207/30256* (2013.01)

(58) Field of Classification Search
CPC ...... G06V 20/588; G06V 20/58; G06V 10/26; G06T 7/38; G06T 7/70;

(Continued)

(56) References Cited

U.S. PATENT DOCUMENTS

| | | | | |
|---|---|---|---|---|
| 2020/0218905 A1* | 7/2020 | Wang | ..................... | G01C 21/30 |
| 2020/0218906 A1* | 7/2020 | Wang | ................... | G06V 20/588 |
| 2021/0365694 A1* | 11/2021 | Lee | ....................... | G06V 20/588 |

FOREIGN PATENT DOCUMENTS

| | | | | | |
|---|---|---|---|---|---|
| CN | 110136182 A | * | 8/2019 | .............. | G06T 7/11 |
| CN | 107463918 B | * | 4/2020 | ......... | G06K 9/00798 |

(Continued)

OTHER PUBLICATIONS

J. Jeong, Y. Cho and A. Kim, "Road-SLAM : Road marking based SLAM with lane-level accuracy," 2017 IEEE Intelligent Vehicles Symposium (IV), Los Angeles, CA, USA, 2017, pp. 1736-1473, doi: 10.1109/IVS.2017.7995958. keywords: (Year: 2017).*

(Continued)

*Primary Examiner* — Utpal D Shah
*Assistant Examiner* — Jack Peter Kraynak
(74) *Attorney, Agent, or Firm* — Sheridan Ross P.C.

(57) ABSTRACT

The disclosure relates to a lane line determination method and system, a vehicle, and a storage medium, and the lane line determination method includes: capturing a road image for a current location in a vehicle coordinate system; recognizing the road image and generating basic lane lines for the current location; extracting map lane lines for the current location; mapping the map lane lines to the vehicle coordinate system to obtain auxiliary lane lines; registering the basic lane lines with the auxiliary lane lines, the registration being performed based on confidence levels of the basic lane lines; and generating target lane lines based on the registered auxiliary lane lines and the basic lane lines. According to the lane line determination method, an operation such as correction can be performed, according to a condition, on a visually captured lane line by using a map lane line, thereby improving accuracy of the lane line detection.

13 Claims, 2 Drawing Sheets

(58) Field of Classification Search
CPC . G06T 2207/10028; G06T 2207/30256; G06T 3/14; G06T 7/30; G06T 7/33–344; G06T 2207/30261; G06T 2207/30264
See application file for complete search history.

(56) References Cited

FOREIGN PATENT DOCUMENTS

| CN | 111242031 A | * | 6/2020 | ............ G01S 17/88 |
| CN | 112528918 A | * | 3/2021 | ............ G06F 16/29 |
| WO | WO 2020/004817 | | 1/2020 | |
| WO | WO 2020/154967 | | 8/2020 | |
| WO | WO 2021/047275 | | 3/2021 | |
| WO | WO-2021047275 A1 | * | 3/2021 | .......... B60W 60/001 |

OTHER PUBLICATIONS

Gruyer et al. "Map-Aided Localization with Lateral Perception," IEEE, 2014 IEEE Intelligent Vehicles Symposium (IV), Jun. 8-11, 2014, pp. 674-680.
SEPP "Creating High-Definition Vector Maps for Autonomous Driving," University of Tartu, 2021, Masters Thesis, 84 pages.
Wang et al. "Map-Based Localization Method for Autonomous Vehicles Using 3D-LIDAR," IFAC PapersOnLine, 2017, vol. 50, No. 1, pp. 276-281.
Extended Search Report for European Patent Application No. 22165389.2, dated Sep. 20, 2022, 16 pages.

\* cited by examiner

FIG. 1

FIG. 2

LANE LINE DETERMINATION METHOD AND SYSTEM, VEHICLE, AND STORAGE MEDIUM

CROSS-REFERENCE TO RELATED APPLICATION

This application claims the benefit of China Patent Application No. 202110659852.1 filed Jun. 15, 2021, the entire contents of which are incorporated herein by reference in its entirety.

TECHNICAL FIELD

The disclosure relates to the lane detection field, and in particular, to a lane line determination method and system, a vehicle, and a storage medium.

BACKGROUND ART

Among driver assistance functions, accurate and stable detection of a (current) lane of a host vehicle and an adjacent lane is the basis for numerous control functions, and lane detection and construction are highly dependent on a lane line sensing capability. At present, a vehicle having driver assistance functions generally uses a camera to sense lane lines in a specific range in front of the vehicle and construct a lane based on a sensing result. Because the sensing by the camera is subject to environmental factors such as actual scenes, weather and light conditions, and other surrounding vehicles, the sensing result may have missed and false detection compared with the real physical world, causing a failure of the vehicle to construct correct lane information and finally causing an exit of the driver assistance functions. This may even jeopardize driving safety.

SUMMARY OF THE DISCLOSURE

Embodiments of the disclosure provide a lane line determination method and system, a vehicle, and a storage medium, so that a visually captured lane line can be corrected by using a map lane line according to a condition.

According to an aspect of the disclosure, a lane line determination method is provided, including: capturing a road image for a current location in a vehicle coordinate system; recognizing the road image and generating basic lane lines for the current location; extracting map lane lines for the current location; mapping the map lane lines to the vehicle coordinate system to obtain auxiliary lane lines; registering the basic lane lines with the auxiliary lane lines, the registration being performed based on confidence levels of the basic lane lines; and generating target lane lines based on the registered auxiliary lane lines and the basic lane lines.

In some embodiment of the disclosure, optionally, the registering the basic lane lines with the auxiliary lane lines includes: using lane lines with confidence levels exceeding a first threshold in the basic lane lines as lane lines to be registered; and registering the basic lane lines with the auxiliary lane lines based on at least some of the lane lines to be registered.

In some embodiment of the disclosure, optionally, the registering the basic lane lines with the auxiliary lane lines includes: generating, based on point clouds in the auxiliary lane lines, point cloud groups to be registered; for each of the lane lines to be registered: calculating relative distances of the point cloud groups to be registered from a current lane line to be registered; and using a point cloud group to be registered of which a relative distance is the smallest and is less than a second threshold as the registered point cloud group for the current lane line to be registered.

In some embodiment of the disclosure, optionally, the generating target lane lines based on the registered auxiliary lane lines and the basic lane lines includes: if a proportion of the lane lines to be registered that do not have registered point cloud groups exceeds a third threshold, outputting the basic lane lines as the target lane lines.

In some embodiment of the disclosure, optionally, the registering the basic lane lines with the auxiliary lane lines includes: for the lane line to be registered having the registered point cloud group, performing point cloud registration between the lane line to be registered and the corresponding registered point cloud group, where the point cloud registration includes: discretizing the lane lines to be registered corresponding to a predetermined field of view of the road image to obtain target point clouds for the point cloud registration, wherein a density of the discretized point clouds is greater than a density of the point clouds of the registered point cloud group; using the registered point cloud group corresponding to the predetermined field of view as start point clouds for the point cloud registration; and determining, in an iterative manner, a parameter for translation/rotation from the start point clouds to the target point clouds.

In some embodiment of the disclosure, optionally, the generating target lane lines based on the registered auxiliary lane lines and the basic lane lines includes: if the parameter for translation/rotation exceeds a predetermined threshold, outputting the basic lane lines as the target lane lines.

In some embodiment of the disclosure, optionally, the generating target lane lines based on the registered auxiliary lane lines and the basic lane lines includes: during point cloud registration, if a residual error between the target point clouds and point clouds obtained by transforming the start point clouds based on the parameter for translation/rotation exceeds a fourth threshold, outputting the basic lane lines as the target lane lines.

In some embodiment of the disclosure, optionally, the registering the basic lane lines with the auxiliary lane lines includes: registering the auxiliary lane lines with the basic lane lines based on the parameter for translation/rotation; and the generating target lane lines based on the registered auxiliary lane lines and the basic lane lines includes: for each of the basic lane lines: calculating relative distances of the point cloud groups in the registered auxiliary lane lines from a current basic lane line; using a point cloud group of which a relative distance is the smallest as a calibration point cloud group of the current basic lane line; and correcting the current basic lane line by using the calibration point cloud group.

In some embodiment of the disclosure, optionally, the generating target lane lines based on the registered auxiliary lane lines and the basic lane lines includes: for a lane line with a length less than a fifth threshold in the basic lane lines, if the lane line has the calibration point cloud group, fitting a first lane curve by using the calibration point cloud group, and supplementing the lane line with the first lane curve.

In some embodiment of the disclosure, optionally, the generating target lane lines based on the registered auxiliary lane lines and the basic lane lines includes: for a first lane line with a confidence level less than a sixth threshold in the basic lane lines, if the first lane line has the calibration point cloud group, fitting a second lane curve by using the calibration point cloud group, and using a fitting parameter of the second lane curve as a parameter of the first lane line; and/or for a second lane line that does not have the calibration point cloud group in the basic lane lines, if: the second lane line overlaps any point cloud group in the registered auxiliary lane lines, but a relative distance of the overlapping portion exceeds a seventh threshold; and relative distances of the basic lane lines from the registered auxiliary lane lines are less than an eighth threshold; fitting a third lane curve by using the point cloud group in the overlapping portion, and using a fitting parameter of the third lane curve as a parameter of the second lane line.

According to another aspect of the disclosure, a lane line determination system is provided, including: a capturing unit, configured to capture a road image for a current location in a vehicle coordinate system; a recognition unit, configured to recognize the road image and generate basic lane lines for the current location; an extraction unit, configured to extract map lane lines for the current location; a mapping unit, configured to map the map lane lines to the vehicle coordinate system to obtain auxiliary lane lines; a registration unit, configured to register the basic lane lines with the auxiliary lane lines, the registration being performed based on confidence levels of the basic lane lines; and a determination unit, configured to generate target lane lines based on the registered auxiliary lane lines and the basic lane lines.

In some embodiment of the disclosure, optionally, the registration unit is further configured to: use lane lines with confidence levels exceeding a first threshold in the basic lane lines as lane lines to be registered; and register the basic lane lines with the auxiliary lane lines based on at least some of the lane lines to be registered.

In some embodiment of the disclosure, optionally, the registration unit is further configured to: generate, based on point clouds in the auxiliary lane lines, point cloud groups to be registered; for each of the lane lines to be registered: calculate relative distances of the point cloud groups to be registered from a current lane line to be registered; and use a point cloud group to be registered of which a relative distance is the smallest and is less than a second threshold as the registered point cloud group for the current lane line to be registered.

In some embodiment of the disclosure, optionally, the determination unit is further configured to: if a proportion of the lane lines to be registered that do not have registered point cloud groups exceeds a third threshold, instruct the determination unit to output the basic lane lines as the target lane lines.

In some embodiment of the disclosure, optionally, the registration unit is further configured to: for the lane line to be registered having the registered point cloud group, perform point cloud registration between the lane line to be registered and the corresponding registered point cloud group, where the point cloud registration includes: discretizing the lane lines to be registered corresponding to a predetermined field of view of the road image to obtain target point clouds for the point cloud registration, where a density of the discretized point clouds is greater than a density of the point clouds of the registered point cloud group; using the registered point cloud group corresponding to the predetermined field of view as start point clouds for the point cloud registration; and determine, in an iterative manner, a parameter for translation/rotation from the start point clouds to the target point clouds.

In some embodiment of the disclosure, optionally, the determination unit is further configured to, if the parameter for translation/rotation exceeds a predetermined threshold, output the basic lane lines as the target lane lines.

In some embodiment of the disclosure, optionally, the determination unit is further configured to: if a residual error between the target point clouds and point clouds obtained by transforming the start point clouds based on the parameter for translation/rotation exceeds a fourth threshold, output the basic lane lines as the target lane lines.

In some embodiment of the disclosure, optionally, the registration unit is further configured to: register the auxiliary lane lines with the basic lane lines based on the parameter for translation/rotation; and the determination unit is further configured to, for each of the basic lane lines: calculate relative distances of the point cloud groups in the registered auxiliary lane lines from a current basic lane line; use a point cloud group of which a relative distance is the smallest as a calibration point cloud group of the current basic lane line; and correct the current basic lane line by using the calibration point cloud group.

In some embodiment of the disclosure, optionally, the determination unit is further configured to: for a lane line with a length less than a fifth threshold in the basic lane lines, if the lane line has the calibration point cloud group, fit a first lane curve by using the calibration point cloud group, and supplement the lane line with the first lane curve.

In some embodiment of the disclosure, optionally, the determination unit is further configured to: for a first lane line with a confidence level less than a sixth threshold in the basic lane lines, if the first lane line has the calibration point cloud group, fit a second lane curve by using the calibration point cloud group, and use a fitting parameter of the second lane curve as a parameter of the first lane line; and/or for a second lane line that does not have the calibration point cloud group in the basic lane lines, if: the second lane line overlaps any point cloud group in the registered auxiliary lane lines, but a relative distance of the overlapping portion exceeds a seventh threshold; and relative distances of the basic lane lines from the registered auxiliary lane lines are less than an eighth threshold; fit a third lane curve by using the point cloud group in the overlapping portion, and use a fitting parameter of the third lane curve as a parameter of the second lane line.

According to another aspect of the disclosure, a vehicle is provided, including any one of the lane line determination systems described above.

According to another aspect of the disclosure, a computer-readable storage medium is provided, where the computer-readable storage medium stores instructions, and the instructions, when executed by a processor, cause the processor to perform any one of the lane line determination methods described above.

BRIEF DESCRIPTION OF THE DRAWINGS

The above and other objectives and advantages of the disclosure will be more thorough and clearer from the following detailed description in conjunction with the drawings, where the same or similar elements are represented by the same reference numerals.

DETAILED DESCRIPTION OF EMBODIMENTS

For the sake of brevity and illustrative purposes, the principles of the disclosure are mainly described herein with reference to its exemplary embodiments. However, those skilled in the art can easily appreciate that the same principle can be equivalently applied to all types of lane line determination methods and systems, vehicles, and storage media, and a same or similar principle can be implemented. These variations do not depart from the true spirit and scope of the disclosure.

Various thresholds are described in the following embodiments, and although the thresholds may have different names, thresholds with different names may also have a same value in the case of a same dimension/unit.

According to an aspect of the disclosure, a lane line determination method is provided. In some of the examples below, according to the lane line determination method, lane line coordinate point clouds in a high-precision map are used and registered with lane lines perceived by a camera, and map lane lines in a positioning result are transformed into a camera coordinate system. Two sets of the lane lines are compared to find a lane line being missed or wrongly recognized by the camera, or having a low confidence level, and a curve is fitted by using coordinate points of the corresponding lane line in the high-precision map for correction.

Figure 1:
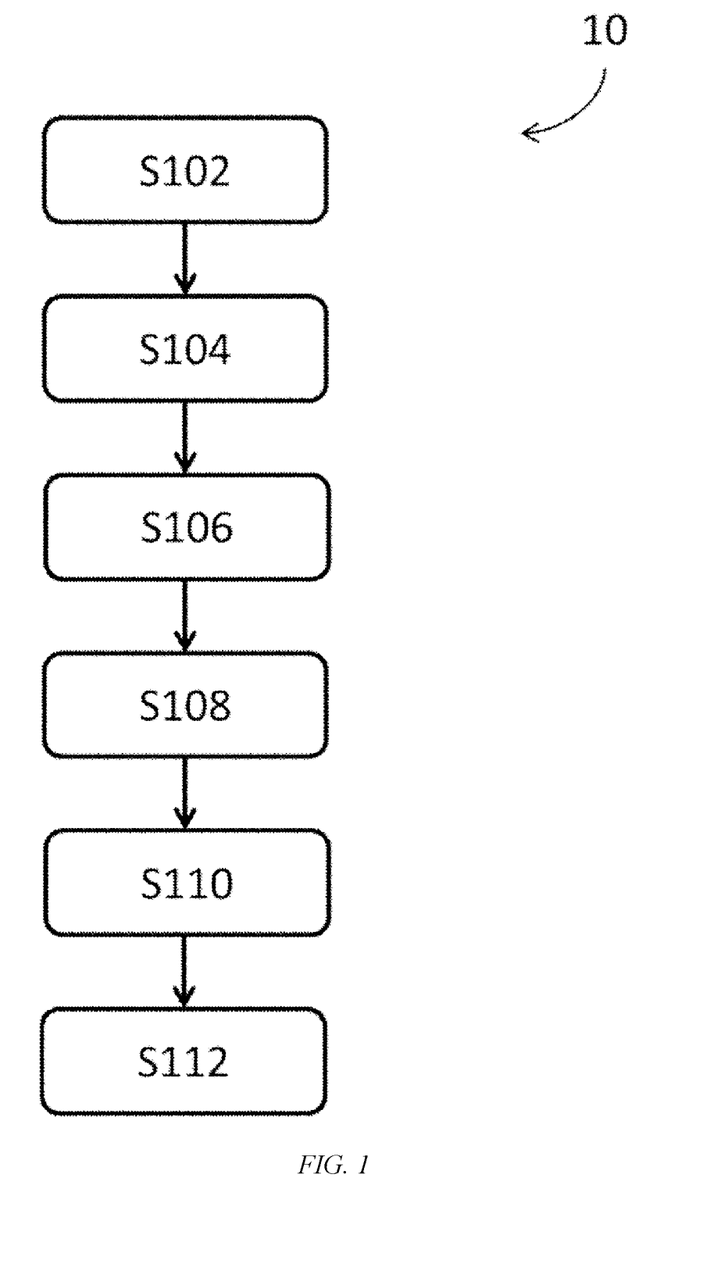
FIG. 1 shows a lane line determination method according to an embodiment of the disclosure.

As shown in FIG. 1, a lane line determination method 10 includes the following steps. In step S102 of the lane line determination method 10, a road image for a current location is captured in a vehicle coordinate system; in step S104, the road image is recognized and basic lane lines for the current location are generated; in step S106, map lane lines for the current location are extracted; in step S108, the map lane lines are mapped to the vehicle coordinate system to obtain auxiliary lane lines; in step S110, the basic lane lines are registered with the auxiliary lane lines, and the registration is performed based on confidence levels of the basic lane lines; and in step S112, target lane lines are generated based on the registered auxiliary lane lines and the basic lane lines.

In step S102 of the lane line determination method 10, the road image for the current location is captured in the vehicle coordinate system, and in step S104, the road image is recognized and the basic lane lines for the current location are generated. In the following example, the basic lane lines are also referred to as camera lane lines since the camera may be used to capture an image for generating the basic lane lines. Lane lines obtained through recognition by an image capturing device such as a camera can be used as a basis for automatic driving/auxiliary driving. Since a device such as a camera is fixed in relative to a vehicle body, it is more convenient to perform image capture, processing, and recognition in a vehicle coordinate system. The vehicle coordinate system in the disclosure is a coordinate system using a position (such as a position where a camera is located) on a vehicle body as an origin. In some examples, the vehicle coordinate system is also referred to as a camera coordinate system if the position where the camera is located is used as the origin.

In addition, since the vehicle may be in a constantly moving state and a capturing object of a device such as a camera is also limited to a specific range, the detected lane line is correlated with a geographical location. In other words, basic lane lines obtained for each (current) location may be different.

In step S106 of the lane line determination method 10, the map lane lines for the current location are extracted. For example, based on a GPS sensor of a host vehicle and motion sensors such as a speed sensor and a corner of the host vehicle, longitude and latitude coordinates of the host vehicle can be further calculated by using a positioning module of the host vehicle. Then, longitude and latitude coordinates of lane lines, stored in a form of point clouds (group), in a specific range in front of the host vehicle may be obtained from a high-precision map engine according to the longitude and latitude coordinates of the host vehicle and used as (high-precision) map lane lines.

In step S108 of the lane line determination method 10, the map lane lines are mapped to the vehicle coordinate system to obtain auxiliary lane lines. For example, point clouds of high-precision map lane lines may be transformed into a coordinate system of the host vehicle by using the longitude and latitude coordinates and an orientation of the vehicle calculated by the positioning module of the host vehicle. The high-precision map lane lines are collected and prepared in advance, and the high-precision map lane lines are generally formed by taking the ground as a reference system. Therefore, in order to make the high-precision map lane lines available on a moving vehicle, they can be transformed into a vehicle coordinate system.

In step S110 of the lane line determination method 10, the basic lane lines are registered with the auxiliary lane lines, and the registration is performed based on confidence levels of the basic lane lines. Considering that there is some error in the positioning module and an origin/orientation of the coordinate system of the host vehicle in the positioning module does not coincide with an origin/orientation of the vehicle coordinate system (for example, the camera coordinate system), a deviation between the two coordinate systems needs to be corrected through registration. It should be noted that the registration is a prerequisite for some subsequent operations such as correction, and therefore the accuracy of the registration must be improved. Therefore, the registration in step S110 is performed based on the confidence levels of the basic lane lines, so that the reliability of the registration can be ensured.

In step S112 of the lane line determination method 10, target lane lines are generated based on the registered auxiliary lane lines and the basic lane lines. For example, a lane line being missed or wrongly recognized by the camera, or having a low confidence level can be corrected by fitting a curve by using coordinate points of the corresponding lane line in the high-precision map. In some examples, if conditions described in detail below are not satisfied, target lane lines may be also generated only based on the basic lane lines without considering the registered auxiliary lane lines during generation of the target lane lines, which may be regarded as a special example of "generating the target lane lines based on the registered auxiliary lane lines and the basic lane lines".

In some embodiment of the disclosure, registering the basic lane lines with the auxiliary lane lines in step S110 is specifically implemented by: using lane lines of which confidence levels exceed a first threshold in the basic lane lines as lane lines to be registered; and registering the basic lane lines with the auxiliary lane lines based on at least some of the lane lines to be registered (for example, all lane lines to be registered or some of the lane lines to be registered). In this way, in the following registration process, lane lines with lower confidence levels in the basic lane lines are excluded, to prevent these lane lines from affecting a registration effect, or even affecting subsequent operations such as correction.

In some embodiment of the disclosure, a process of registering the basic lane lines with the auxiliary lane lines in step S110 specifically includes: generating, based on the point clouds in the auxiliary lane lines, point cloud groups to be registered, and executing the following operations for each of the lane lines to be registered until the operation is completed for all of the lane lines to be registered. If the operation is executed for the $i^{th}$ lane line, the $i^{th}$ lane line is also referred to as a current lane line to be registered. The operations specifically include: calculating relative distances of the point cloud groups to be registered from the current lane line to be registered; and using a point cloud group to be registered of which a relative distance is the smallest and is less than a second threshold as the registered point cloud group for the current lane line to be registered. If relative distances of all point cloud groups to be registered are the smallest and are less than a second threshold, the basic lane lines are registered with the auxiliary lane lines based on all the lane lines to be registered. If relative distances of some point cloud groups to be registered are the smallest and are less than the second threshold, the basic lane lines are registered with the auxiliary lane lines based on the some of the lane lines to be registered.

In some examples, for example, connectable point cloud groups can be combined according to a connection relationship between point cloud groups of various lane lines provided in a high-precision map, to generate all possible point cloud groups to be paired in the high-precision map. Then, relative distances of each lane line to be paired from point cloud groups to be paired in the map lane line are calculated, and a point cloud group of which a relative distance is the smallest and is less than the second threshold is selected as a paired point cloud group of the lane line to be paired (also referred to as a camera lane line).

In some embodiment of the disclosure, the step S112 in the lane line determination method 10 specifically includes: if a proportion of the lane lines to be registered that do not have registered point cloud groups exceeds a third threshold, the current camera measurement result does not match with the lane lines in the map. In this case, the basic lane lines may be output as the target lane lines. And other calculation steps can also be stopped, so that the vehicle returns to a single-camera perception state.

In some embodiment of the disclosure, if a proportion of the lane lines to be registered that do not have registered point cloud groups does not exceed the third threshold, in step S110, point cloud registration is performed between the lane lines to be registered that have registered point cloud groups and the corresponding registered point cloud groups. More particularly, the point cloud registration can include the following process: discretizing the lane lines to be registered corresponding to a predetermined field of view of the road image to obtain target point clouds for point cloud registration, where a density of the discretized point clouds is greater than a density of the point clouds of the registered point cloud group; using the registered point cloud group corresponding to the predetermined field of view as start point clouds of the point cloud registration; and determining, in an iterative manner, a parameter for translation/rotation from the start point clouds to the target point clouds.

Still in the above example, the camera lane lines that have the paired point cloud groups and their corresponding paired point cloud groups can be selected for registration. First, the camera lane lines can be discretized to change from continuous lines to a number of point clouds, and a density of the discretized point clouds should be greater than a density of the paired point cloud group. A result obtained after the discretization is referred to as registered target point clouds, and considering that a capability of the camera for detecting a lane line at a distance is lower, only lane lines in a specific range may be selected for discretization. For example, only the lane lines within a specific field of view may be discretized.

Second, in the paired point cloud group, only points within a discretization range of the corresponding camera lane lines are selected to form registered start point clouds. In other words, the registered point cloud group corresponding to the predetermined field of view described above may be used as the start point clouds of the point cloud registration.

Finally, an iterative optimization method may be used to calculate a parameter for relative translation/rotation between the start point clouds and the target point clouds. In the process, points within the target point clouds closest to the points in the start point clouds need to be selected. Since a pairing relationship between the point cloud group of the high-precision map lane lines and the point cloud group of the camera lane lines has been obtained, a range of the points can be narrowed during selection of the closest points. In addition, considering that the points in the point cloud of the lane lines have a relative relationship with previous and following points, the selection range can be further narrowed based on a selection result of a previous point during selection of the closest points. In this way, computational load of the registration calculation on the system is reduced.

In some embodiment of the disclosure, if the parameter for translation/rotation exceeds a predetermined threshold, the step S112 in the lane line determination method 10 may further specifically include outputting the basic lane lines as the target lane lines. In some examples, if the parameter for translation/rotation obtained through iteration is relatively large, it is considered that there is a relatively large start deviation between lane lines from the camera and the high-precision map, and it is considered that there is a sensor failure in either the camera or the map. In this case, other calculation steps can be stopped and the single-camera perception state is used, and only the basic lane lines are outputted as the target lane lines.

In some embodiment of the disclosure, the step S112 in the lane line determination method 10 specifically includes: during point cloud registration, if a residual error between the target point clouds and point clouds obtained by transforming the start point clouds based on the parameter for translation/rotation exceeds a fourth threshold, outputting the basic lane lines as the target lane lines. In some examples, the start point clouds are transformed by using the parameter for translation/rotation obtained through iteration, and the residual error between the transformed point clouds and the target point clouds is calculated. If the error is too large, the registration is considered to be failed. In this case, other calculation steps can be stopped and the single-camera perception state is used, and only the basic lane lines are outputted as the target lane lines.

In some embodiment of the disclosure, a process of registering the basic lane lines with the auxiliary lane lines in step S110 specifically includes: registering the auxiliary lane lines with the basic lane lines based on the parameter for translation/rotation. A process of the generating target lane lines based on the registered auxiliary lane lines and the basic lane lines in step S112 specifically includes the following steps: for each of the basic lane lines: calculating relative distances of the point cloud groups in the registered auxiliary lane lines from a current basic lane line; using a point cloud group of which a relative distance is the smallest as a calibration point cloud group of the current basic lane line; and correcting (such as supplementing and amending) the current basic lane line by using the calibration point cloud group.

For example, coordinates of all points of the map lane lines can be transformed into a camera coordinate system based on the registration result. In this case, the map lane lines and the camera lane lines are in the most similar state. In this case, a point cloud group having the smallest relative distance can be selected as a corrected pair by comparing the relative distances of each lane line perceived by the camera from point cloud groups of the corresponding map lane line.

In some embodiment of the disclosure, generating target lane lines based on the registered auxiliary lane lines and the basic lane lines includes: for a lane line with a length less than a fifth threshold in the basic lane lines, if the lane line has the calibration point cloud group, fitting a first lane curve by using the calibration point cloud group, and supplementing the lane line with the first lane curve.

In some examples, a camera perception result may be supplemented with the map lane line information. For example, unpaired point cloud groups of a map lane line can be selected and combined according to a connection relationship, to fit as a cubic curve form, and add to a lane line pool for subsequent lane line generation. For lane lines with a relatively short length perceived by the camera, if the lane lines have paired point cloud groups of the map lane line, a cubic curve may be fitted by using the paired point cloud groups for prolonging the camera lane lines.

In some embodiment of the disclosure, generating target lane lines based on the registered auxiliary lane lines and the basic lane lines includes: for a first lane line with a confidence level less than a sixth threshold in the basic lane lines, if the first lane line has the calibration point cloud group, fitting a second lane curve by using the calibration point cloud group, and using a fitting parameter of the second lane curve as a parameter of the first lane line; and/or for a second lane line that does not have the calibration point cloud group in the basic lane lines, the following two conditions are both met: (1) the second lane line overlaps any point cloud group in the registered auxiliary lane lines, but a relative distance of the overlapping portion exceeds a seventh threshold, and (2) relative distances of the basic lane lines from the registered auxiliary lane lines are less than an eighth threshold, fitting a third lane curve by using the point cloud group in the overlapping portion, and using a fitting parameter of the third lane curve as a parameter of the second lane line.

In some examples, the camera perception result may be amended by using map lane line information. For example, for a lane line having a low confidence level perceived by the camera, if the lane line has paired point cloud groups of the map lane line, a cubic curve may be fitted by using the point cloud groups of the map lane line and the corresponding camera lane line parameter may be replaced by a fitting parameter. For another example, a lane line perceived by the camera has no paired point cloud groups of the map lane line, and has a partial overlap with a point cloud group of the map lane line but a relative distance is relatively large; and in the meantime, most other camera lane lines are well paired with the point cloud groups of the rest lane lines of the map. In this case, it can be considered that the camera lane line is wrongly recognized, and a parameter of the camera lane line is replaced by a fitting curve of the partially overlapping point cloud groups of the map lane line.

Figure 2:
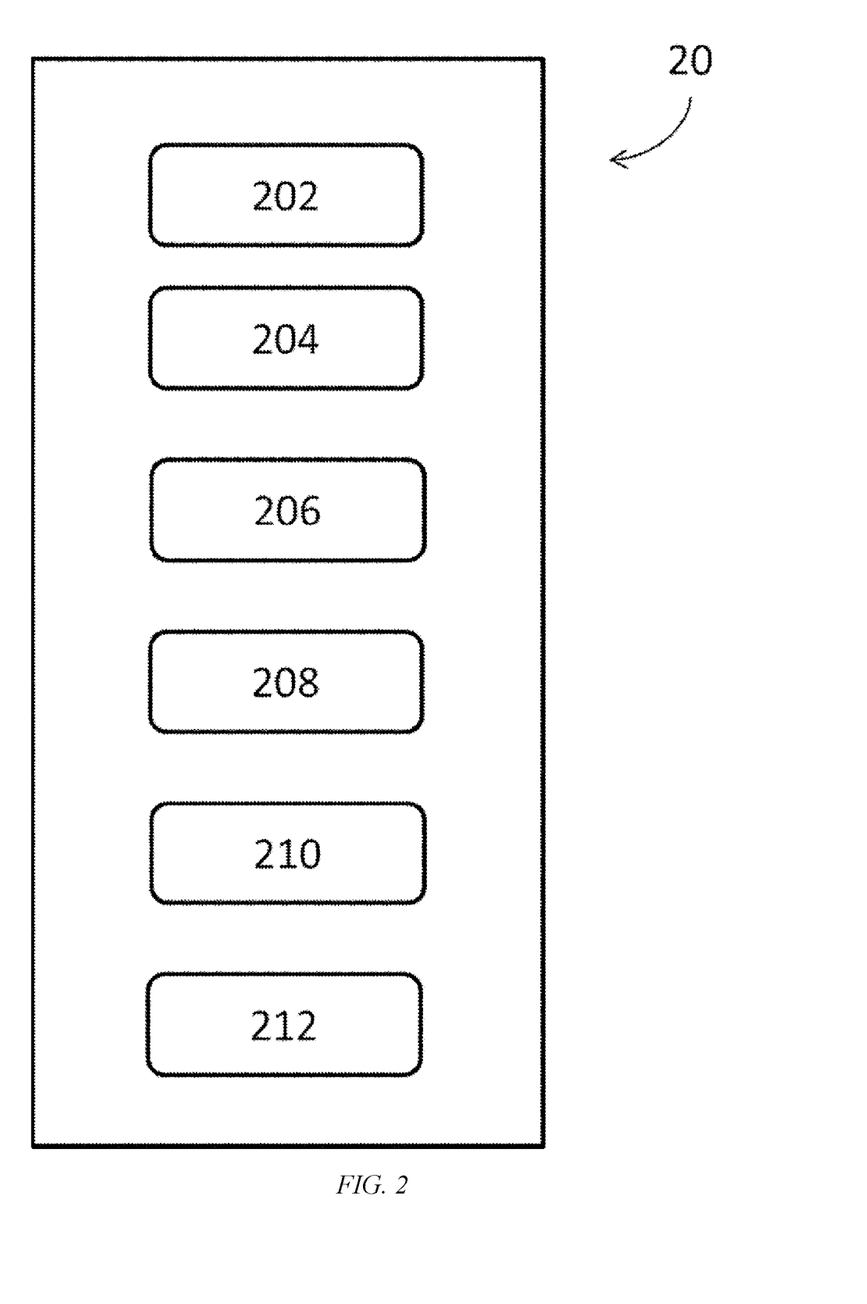
FIG. 2 shows a lane line determination system according to an embodiment of the disclosure.

According to another aspect of the disclosure, a lane line determination system is provided. As shown in FIG. 2, the lane line determination system 20 includes a capturing unit 202, a recognition unit 204, an extraction unit 206, a mapping unit 208, a registration unit 210, and a determination unit 212.

The capturing unit 202 of the lane line determination system 20 is configured to capture a road image for a current location in a vehicle coordinate system, and the recognition unit 204 is configured to recognize the road image and generate basic lane lines for the current location. In the following example, the basic lane lines are also referred to as camera lane lines since the camera may be used to capture an image for generating the basic lane lines. Lane lines obtained through recognition by an image capturing device such as a camera can be used as a basis for automatic driving/auxiliary driving. Since a device such as a camera is fixed in relative to a vehicle body, it is more convenient to perform image capture, processing, and recognition in a vehicle coordinate system. The vehicle coordinate system in the disclosure is a coordinate system using a position (such as a position where a camera is located) on a vehicle body as an origin. In some examples, the vehicle coordinate system is also referred to as a camera coordinate system if the position where the camera is located is used as the origin.

In addition, since the vehicle may be in a constantly moving state and a capturing object of a device such as a camera is also limited to a specific range, the detected lane line is correlated with a geographical location. In other words, basic lane lines obtained for each (current) location may be different.

The extraction unit 206 of the lane line determination system 20 is configured to extract map lane lines for the current location. For example, based on a GPS sensor of a host vehicle and motion sensors such as a speed sensor and a corner of the host vehicle, longitude and latitude coordinates of the host vehicle can be further calculated by using a positioning module of the host vehicle. Then, the extraction unit 206 can obtain, from a high-precision map engine according to the longitude and latitude coordinates of the host vehicle, longitude and latitude coordinates of the lane lines, stored in a form of point clouds (group), in a specific range in front of the host vehicle and use the lane lines as (high-precision) map lane lines.

The mapping unit 208 of the lane line determination system 20 is configured to map the map lane lines to the vehicle coordinate system to obtain auxiliary lane lines. For example, the mapping unit 208 can utilize the longitude and latitude coordinates and an orientation of the vehicle calculated by the positioning module of the host vehicle to transform the point clouds of the lane lines of the high-precision map into the coordinate system of the host vehicle. The high-precision map lane lines are collected and prepared in advance, and the high-precision map lane lines are generally formed by taking the ground as a reference system. Therefore, in order to make the high-precision map lane lines available on a moving vehicle, they can be transformed into a vehicle coordinate system.

The registration unit 210 of the lane line determination system 20 is configured to register the basic lane lines with the auxiliary lane lines, the registration being performed based on confidence levels of the basic lane lines. Considering that there is some error in the positioning module and an origin/orientation of the coordinate system of the host vehicle in the positioning module does not coincide with an origin/orientation of the vehicle coordinate system (for example, the camera coordinate system), a deviation between the two coordinate systems needs to be corrected through registration. It should be noted that the registration is a prerequisite for some subsequent operations such as correction, and therefore the accuracy of the registration must be improved. Therefore, the registration operation of the registration unit 210 is performed based on the confidence levels of the basic lane lines, so that the reliability of the registration can be ensured.

The determination unit 212 of the lane line determination system 20 is configured to generate target lane lines based on the registered auxiliary lane lines and the basic lane lines. For example, a lane line being missed or wrongly recognized by the camera, or having a low confidence level can be corrected by fitting a curve by using coordinate points of the corresponding lane line in the high-precision map. In some examples, if conditions described in detail below are not satisfied, the determination unit 212 can also generate target lane lines only based on the basic lane lines without considering the registered auxiliary lane lines when generating the target lane lines, which may be regarded as a special example of "generating the target lane lines based on the registered auxiliary lane lines and the basic lane lines".

In some embodiment of the disclosure, the registration unit 210 is further configured to: use lane lines of which confidence levels exceed a first threshold in the basic lane lines as lane lines to be registered; and register the basic lane lines with the auxiliary lane lines based on at least some of the lane lines to be registered (for example, all lane lines to be registered or some of the lane lines to be registered). In this way, in the following registration process, lane lines with lower confidence levels in the basic lane lines are excluded, to prevent these lane lines from affecting a registration effect, or even affecting subsequent operations such as correction.

In some embodiment of the disclosure, the registration unit 210 is further configured to: generate, based on the point clouds in the auxiliary lane lines, point cloud groups to be registered, and execute the following operations for each of the lane lines to be registered until the operation is completed for all of the lane lines to be registered. If the operation is executed for the i$^{th}$ lane line, the i$^{th}$ lane line is also referred to as a current lane line to be registered. The operations specifically include: calculating relative distances of the point cloud groups to be registered from the current lane line to be registered; and using a point cloud group to be registered of which a relative distance is the smallest and is less than a second threshold as the registered point cloud group for the current lane line to be registered. If relative distances of all point cloud groups to be registered are the smallest and are less than a second threshold, the registration unit 210 registers the basic lane lines with the auxiliary lane lines based on all the lane lines to be registered. If relative distances of some point cloud groups to be registered are the smallest and are less than the second threshold, the registration unit 210 registers the basic lane lines with the auxiliary lane lines based on the some of the lane lines to be registered.

In some examples, for example, connectable point cloud groups can be combined according to a connection relationship between point cloud groups of various lane lines provided in a high-precision map, to generate all possible point cloud groups to be paired in the high-precision map. Then, relative distances of each lane line to be paired from point cloud groups to be paired in the map lane line are calculated, and a point cloud group of which a relative distance is the smallest and is less than the second threshold is selected as a paired point cloud group of the lane line to be paired (also referred to as a camera lane line).

In some embodiment of the disclosure, the determination unit 212 is further configured to: if a proportion of the lane lines to be registered that do not have registered point cloud groups exceeds a third threshold, instruct the determination unit 212 to output the basic lane lines as the target lane lines. And other calculation steps can also be stopped, so that the vehicle returns to a single-camera perception state.

In some embodiment of the disclosure, if a proportion of the lane lines to be registered that do not have registered point cloud groups does not exceed the third threshold, the registration unit 210 is further configured to perform cloud registration between the lane lines to be registered that have registered point cloud groups and the corresponding registered point cloud groups. More particularly, the point cloud registration can include the following process: discretizing the lane lines to be registered corresponding to a predetermined field of view of the road image to obtain target point clouds for point cloud registration, where a density of the discretized point clouds is greater than a density of the point clouds of the registered point cloud group; using the registered point cloud group corresponding to the predetermined field of view as start point clouds of the point cloud registration; and determining, in an iterative manner, a parameter for translation/rotation from the start point clouds to the target point clouds.

Still in the above example, the camera lane lines that have the paired point cloud groups and their corresponding paired point cloud groups can be selected for registration. First, the camera lane lines can be discretized to change from continuous lines to a number of point clouds, and a density of the discretized point clouds should be greater than a density of the paired point cloud group. A result obtained after the discretization is referred to as registered target point clouds, and considering that a capability of the camera for detecting a lane line at a distance is lower, only lane lines in a specific range may be selected for discretization. For example, only the lane lines within a specific field of view may be discretized.

Second, in the paired point cloud group, only points within a discretization range of the corresponding camera lane lines are selected to form registered start point clouds. In other words, the registered point cloud group corresponding to the predetermined field of view described above may be used as the start point clouds of the point cloud registration.

Finally, an iterative optimization method may be used to calculate a parameter for relative translation/rotation between the start point clouds and the target point clouds. In the process, points within the target point clouds closest to the points in the start point clouds need to be selected. Since a pairing relationship between the point cloud group of the high-precision map lane lines and the point cloud group of the camera lane lines has been obtained, a range of the points can be narrowed during selection of the closest points. In addition, considering that the points in the point cloud of the lane lines have a relative relationship with previous and following points, the selection range can be further narrowed based on a selection result of a previous point during selection of the closest points. In this way, computational load of the registration calculation on the system is reduced.

In some embodiment of the disclosure, the determination unit 212 is further configured to: if the parameter for translation/rotation exceeds a predetermined threshold, output the basic lane lines as the target lane lines. In some examples, if the parameter for translation/rotation obtained through iteration is relatively large, it is considered that there is a relatively large start deviation between lane lines from the camera and the high-precision map, and it is considered that there is a sensor failure in either the camera or the map.

In this case, other calculation steps can be stopped and the single-camera perception state is used, and only the basic lane lines are outputted as the target lane lines.

In some embodiment of the disclosure, the determination unit 212 is further configured to: if a residual error between the target point clouds and point clouds obtained by transforming, by the registration unit 210, the start point clouds based on the parameter for translation/rotation exceeds a fourth threshold, output the basic lane lines as the target lane lines. In some examples, the start point clouds are transformed by using the parameter for translation/rotation obtained through iteration, and the residual error between the transformed point clouds and the target point clouds is calculated. If the error is too large, the registration is considered to be failed. In this case, other calculation steps can be stopped and the single-camera perception state is used, and only the basic lane lines are outputted as the target lane lines.

in some embodiment of the disclosure, the registration unit 210 is further configured to register the auxiliary lane lines with the basic lane lines based on the parameter for translation/rotation, and the determination unit 212 is further configured to: for each of the basic lane lines: calculate relative distances of the point cloud groups in the registered auxiliary lane lines and a current basic lane line; use a point cloud group of which a relative distance is the smallest as a calibration point cloud group of the current basic lane line; and correct (such as supplement and amend) the current basic lane line by using the calibration point cloud group.

For example, coordinates of all points of the map lane lines can be transformed into a camera coordinate system based on the registration result. In this case, the map lane lines and the camera lane lines are in the most similar state. In this case, a point cloud group having the smallest relative distance can be selected as a corrected pair by comparing the relative distances of each lane line perceived by the camera from point cloud groups of the corresponding map lane line.

In some embodiment of the disclosure, the determination unit 212 is further configured to: for a lane line with a length less than a fifth threshold in the basic lane lines, if the lane line has the calibration point cloud group, fit a first lane curve by using the calibration point cloud group, and supplement the lane line with the first lane curve.

In some examples, a camera perception result may be supplemented with the map lane line information. For example, unpaired point cloud groups of a map lane line can be selected and combined according to a connection relationship, to fit as a cubic curve form, and add to a lane line pool for subsequent lane line generation. For lane lines with a relatively short length perceived by the camera, if the lane lines have paired point cloud groups of the map lane line, a cubic curve may be fitted by using the paired point cloud groups for prolonging the camera lane lines.

In some embodiment of the disclosure, the determination unit 212 is further configured to: for a first lane line with a confidence level less than a sixth threshold in the basic lane lines, if the first lane line has the calibration point cloud group, fit a second lane curve by using the calibration point cloud group, and use a fitting parameter of the second lane curve as a parameter of the first lane line; and/or for a second lane line that does not have the calibration point cloud group in the basic lane lines, the following two conditions are both met: (1) the second lane line overlaps any point cloud group in the registered auxiliary lane lines, but a relative distance of the overlapping portion exceeds a seventh threshold, and (2) relative distances of the basic lane lines from the registered auxiliary lane lines are less than an eighth threshold, fitting a third lane curve by using the point cloud group in the overlapping portion, and using a fitting parameter of the third lane curve as a parameter of the second lane line.

In some examples, the camera perception result may be amended by using map lane line information. For example, for a lane line having a low confidence level perceived by the camera, if the lane line has paired point cloud groups of the map lane line, a cubic curve may be fitted by using the point cloud groups of the map lane line and the corresponding camera lane line parameter may be replaced by a fitting parameter. For another example, a lane line perceived by the camera has no paired point cloud groups of the map lane line, and has a partial overlap with a point cloud group of the map lane line but a relative distance is relatively large; and in the meantime, most other camera lane lines are well paired with the point cloud groups of the rest lane lines of the map. In this case, it can be considered that the camera lane line is wrongly recognized, and a parameter of the camera lane line is replaced by a fitting curve of the partially overlapping point cloud groups of the map lane line.

According to another aspect of the disclosure, a vehicle is provided, including any one of the lane line determination systems described above. A vehicle configured with a lane line determination system can perform, according to a condition, an operation such as correction on a visually captured lane line by using a map lane line, thereby improving accuracy of the lane line detection.

According to another aspect of the disclosure, a computer-readable storage medium is provided, in which instructions are stored, and the instructions, when executed by a processor, cause the processor to perform any one of the lane line determination methods described above. The computer-readable medium in the disclosure includes various types of computer storage media, and may be any usable medium accessible to a general-purpose or special-purpose computer. For example, the computer-readable medium may include a RAM, a ROM, an EPROM, an EEPROM, a register, a hard disk, a removable hard disk, a CD-ROM or another optical memory, a magnetic disk memory or another magnetic storage device, or any other transitory or non-transitory media that can carry or store expected program code having an instruction or data structure form and be accessible to the general-purpose or special-purpose computer or a general-purpose or special-purpose processor. Data is usually copied magnetically in a disk used herein, while data is usually copied optically by using lasers in a disc. A combination thereof shall also fall within the scope of protection of the computer-readable media. For example, the storage medium is coupled to a processor, so that the processor can read information from and write information to the storage medium. In an alternative solution, the storage medium may be integrated into the processor. The processor and the storage medium may reside in an ASIC. The ASIC may reside in a user terminal. In an alternative solution, the processor and the storage medium may reside as discrete assemblies in a user terminal.

The foregoing descriptions are merely the embodiments of the disclosure, but are not intended to limit the protection scope of the disclosure. Any feasible variation or replacement conceived by a person skilled in the art within the technical scope disclosed in the disclosure shall fall within the scope of protection of the disclosure. In the case of no conflict, the embodiments of the disclosure and features in the embodiments may also be combined with each another. The scope of protection of the disclosure shall be subject to recitations of the claims.

The invention claimed is:

1. A lane line determination method, comprising:
   capturing a road image for a current location in a vehicle coordinate system;
   recognizing the road image and generating basic lane lines for the current location;
   extracting map lane lines for the current location;
   mapping the map lane lines to the vehicle coordinate system to obtain auxiliary lane lines;
   registering the basic lane lines with the auxiliary lane lines, the registration being performed based on confidence levels of the basic lane lines; and
   generating target lane lines based on the registered auxiliary lane lines and the basic lane lines,
   wherein the registering the basic lane lines with the auxiliary lane lines comprises:
      using lane lines with confidence levels exceeding a first threshold in the basic lane lines as lane lines to be registered;
      generating, based on point clouds in the auxiliary lane lines, point cloud groups to be registered;
      for each of the lane lines to be registered:
         calculating relative distances of the point cloud groups to be registered from a current lane line to be registered; and
         using a point cloud group to be registered of which the relative distance is the smallest and is less than a second threshold as a registered point cloud group for the current lane line to be registered; and
      for the lane line to be registered having the registered point cloud group, performing point cloud registration between the lane line to be registered and the corresponding registered point cloud group, wherein the point cloud registration comprises:
         discretizing the lane lines to be registered corresponding to a predetermined field of view of the road image to obtain target point clouds for the point cloud registration, wherein a density of the discretized point clouds is greater than a density of the point clouds of the registered point cloud group;
         using the registered point cloud group corresponding to the predetermined field of view as start point clouds for the point cloud registration; and
         determining, in an iterative manner, a parameter for translation or rotation from the start point clouds to the target point clouds.

2. The method according to claim 1, wherein the generating target lane lines based on the registered auxiliary lane lines and the basic lane lines comprises: if a proportion of the lane lines to be registered that do not have registered point cloud groups exceeds a third threshold, outputting the basic lane lines as the target lane lines.

3. The method according to claim 2, wherein the generating target lane lines based on the registered auxiliary lane lines and the basic lane lines comprises: if the parameter for translation or rotation exceeds a predetermined threshold, outputting the basic lane lines as the target lane lines.

4. The method according to claim 2, wherein the generating target lane lines based on the registered auxiliary lane lines and the basic lane lines comprises: during point cloud registration, if a residual error between the target point clouds and point clouds obtained by transforming the start point clouds based on the parameter for translation or rotation exceeds a fourth threshold, outputting the basic lane lines as the target lane lines.

5. The method according to claim 2, wherein the registering the basic lane lines with the auxiliary lane lines comprises: registering the auxiliary lane lines with the basic lane lines based on the parameter for translation or rotation; and the generating target lane lines based on the registered auxiliary lane lines and the basic lane lines comprises: for each of the basic lane lines: calculating relative distances of the point cloud groups in the registered auxiliary lane lines from a current basic lane line; using a point cloud group of which the relative distance is the smallest as a calibration point cloud group of the current basic lane line; and correcting the current basic lane line by using the calibration point cloud group.

6. The method according to claim 5, wherein the generating target lane lines based on the registered auxiliary lane lines and the basic lane lines comprises:
   for a lane line with a length less than a fifth threshold in the basic lane lines, if the lane line has the calibration point cloud group, fitting a first lane curve by using the calibration point cloud group, and supplementing the lane line with the first lane curve.

7. The method according to claim 5, wherein the generating target lane lines based on the registered auxiliary lane lines and the basic lane lines comprises:
   for a first lane line with a confidence level less than a sixth threshold in the basic lane lines, if the first lane line has the calibration point cloud group, fitting a second lane curve by using the calibration point cloud group, and using a fitting parameter of the second lane curve as a parameter of the first lane line; or
   for a second lane line that does not have the calibration point cloud group in the basic lane lines, if:
      the second lane line overlaps any point cloud group in the registered auxiliary lane lines, but a relative distance of the overlapping portion exceeds a seventh threshold; and
      relative distances of the basic lane lines from the registered auxiliary lane lines are less than an eighth threshold, then:
      fitting a third lane curve by using the point cloud group in the overlapping portion, and using a fitting parameter of the third lane curve as a parameter of the second lane line.

8. A lane line determination system, comprising:
   a camera configured to capture a road image for a current location in a vehicle coordinate system; and
   a processor configured to:
      recognize the road image and generate basic lane lines for the current location;
      extract map lane lines for the current location;
      map the map lane lines to the vehicle coordinate system to obtain auxiliary lane lines;
      register the basic lane lines with the auxiliary lane lines, the registration being performed based on confidence levels of the basic lane lines; and
      generate target lane lines based on the registered auxiliary lane lines and the basic lane lines,
   wherein the registering the basic lane lines with the auxiliary lane lines comprises:
      using lane lines with confidence levels exceeding a first threshold in the basic lane lines as lane lines to be registered;

generating, based on point clouds in the auxiliary lane lines, point cloud groups to be registered;

for each of the lane lines to be registered:
calculating relative distances of the point cloud groups to be registered from a current lane line to be registered; and
using a point cloud group to be registered of which the relative distance is the smallest and is less than a second threshold as a registered point cloud group for the current lane line to be registered; and for the lane line to be registered having the registered point cloud group, performing point cloud registration between the lane line to be registered and the corresponding registered point cloud group, wherein the point cloud registration comprises:
discretizing the lane lines to be registered corresponding to a predetermined field of view of the road image to obtain target point clouds for the point cloud registration, wherein a density of the discretized point clouds is greater than a density of the point clouds of the registered point cloud group;
using the registered point cloud group corresponding to the predetermined field of view as start point clouds for the point cloud registration; and
determining, in an iterative manner, a parameter for translation or rotation from the start point clouds to the target point clouds.

9. The system according to claim 8, wherein the processor is further configured to: if a proportion of the lane lines to be registered that do not have registered point cloud groups exceeds a third threshold, output the basic lane lines as the target lane lines.

10. A non-transitory computer-readable storage medium having instructions stored therein, wherein the instructions, when executed by a processor, causes the processor to perform a lane line determination method, comprising:
capturing a road image for a current location in a vehicle coordinate system;
recognizing the road image and generating basic lane lines for the current location;
extracting map lane lines for the current location;
mapping the map lane lines to the vehicle coordinate system to obtain auxiliary lane lines;
registering the basic lane lines with the auxiliary lane lines, the registration being performed based on confidence levels of the basic lane lines; and generating target lane lines based on the registered auxiliary lane lines and the basic lane lines,
wherein the registering the basic lane lines with the auxiliary lane lines comprises:
using lane lines with confidence levels exceeding a first threshold in the basic lane lines as lane lines to be registered;
generating, based on point clouds in the auxiliary lane lines, point cloud groups to be registered;
for each of the lane lines to be registered:
calculating relative distances of the point cloud groups to be registered from a current lane line to be registered; and
using a point cloud group to be registered of which the relative distance is the smallest and is less than a second threshold as a registered point cloud group for the current lane line to be registered; and
for the lane line to be registered having the registered point cloud group, performing point cloud registration between the lane line to be registered and the corresponding registered point cloud group, wherein the point cloud registration comprises:
discretizing the lane lines to be registered corresponding to a predetermined field of view of the road image to obtain target point clouds for the point cloud registration, wherein a density of the discretized point clouds is greater than a density of the point clouds of the registered point cloud group;
using the registered point cloud group corresponding to the predetermined field of view as start point clouds for the point cloud registration; and
determining, in an iterative manner, a parameter for translation or rotation from the start point clouds to the target point clouds.

11. The method according to claim 1, further comprising controlling a vehicle within a lane using the target lane lines.

12. The system according to claim 8, wherein the processor is configured to control a vehicle within a lane using the target lane lines.

13. The non-transitory computer readable storage medium according to claim 10, wherein the instructions include instructions that when executed by a processor, cause processor to:
control a vehicle within a lane using the target lane lines.

* * * * *